Dec. 28, 1965    A. MONTI    3,226,367
GASKET ASSEMBLY FOR REFRIGERATOR DOOR AND THE LIKE
Filed Feb. 21, 1964

INVENTOR.
Angelo Monti
BY Silverman & Cass
Attys.

United States Patent Office 3,226,367
Patented Dec. 28, 1965

3,226,367
GASKET ASSEMBLY FOR REFRIGERATOR DOOR
AND THE LIKE
Angelo Monti, Chicago, Ill., assignor to Jarrow Products,
Inc., Chicago, Ill., a corporation of Illinois
Filed Feb. 21, 1964, Ser. No. 346,431
11 Claims. (Cl. 20—69)

This invention relates generally to gaskets for refrigerator doors and the like and more particularly, is concerned with a novel gasket assembly for a refrigerator door of the so-called foamed-in type.

Generally, doors for refrigerators and the like are manufactured by assembling together separable pan and shell members to form a hollow enclosure into which insulating material is inserted and to which a gasket is mounted for sealing the refrigerator compartment when the door is closed. The pan and shell members usually are secured together by mechanical fasteners such as screws, rivets or the like. Various insulating materials have been used and recently, the use of foamed plastics such as polyurethane has become common. In many instances, the foam, which has adhesive properties, is utilized also to hold the pan and shell together in lieu of mechanical fasteners. A door of this type is known in the trade as being of the foamed-in variety. This invention is primarily concerned with applying a novel gasket assembly to such a foamed-in door.

Conventionally, the manufacture of doors of the foamed-in variety involves the assembly of the pan and shell members in a jig and loading the foamable plastic material into the resulting enclosure. Heat is applied and the foamable plastic material expanded to fill the otherwise hollow enclosure. The gaskets are assembled to the door either by fastening same directly thereto or by utilizing gasket retainer means normally fastened to the door by means of screws or the like fastening means. Considerable difficulties were encountered in maintaining the pan and shell members of the door in proper assembly during the foaming-in process. Considerable manufacturing expense was encountered due to the necessity for separately installing gaskets and/or retainer means for gaskets upon the refrigerator door subsequent to the foaming-in process. This is particularly of concern where it is desired that the retainer means be permanently mounted to the door and the gasket be removably mounted to the retainer means. Heretofore, such assembly could not take place simultaneously with the foaming-in process. Further, special jigs or fixtures were required to maintain proper positioning of the pan and shell relative to one another during said foaming-in process. Attempts have been made to reduce the manufacturing cost of such doors of the foamed-in type but without success.

Accordingly, the primary object of the invention is to provide a gasket assembly for a refrigerator door or the like of the foamed-in variety which is constructed to enable a gasket to be removably secured to a retainer member, the retainer member having means enabling the parts of the door to be held thereby in assembly during the foaming-in process, and thereafter, said means being permanently embedded in the foam insulating material to hold the retainer member in place.

Another object of the invention is to provide, in a refrigerator door and the like of the foamed-in variety, a relatively rigid retainer member capable of holding the parts of the door in proper position while the foaming process takes place, and thereafter, removably anchoring a flexible gasket, all without the need for screws or like fastening means.

Other advantages and objects of the invention include simplicity of manufacture, ease of installation, adaptability of the structure for use with a wide variety of gasket configurations. These and other advantages will become apparent from the description of preferred embodiments of the invention set forth hereinafter with reference to the accompanying drawing, in which.

Figure 1:
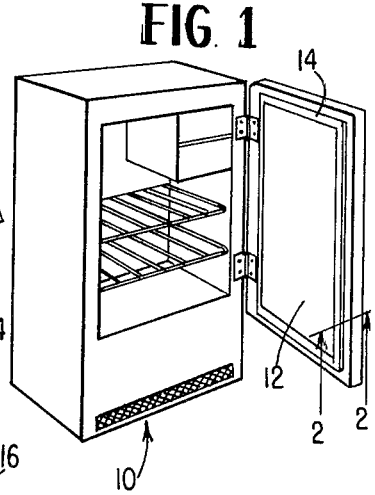
FIG. 1 is a perspective view of a refrigerator with its door open, showing a preferred embodiment of the improved gasket assembly embodying the invention installed thereon.

Referring now to the drawing, in FIG. 1, there is illustrated a refrigerator 10 having a refrigerator door 12 hingedly secured thereto and provided with a gasket 14 therearound. Although this gasket may be one of several types, according to the invention, a relatively rigid member for mounting or retaining the gasket is employed which is suitable for any of said gasket types. Said mounting member preferably is made of a vinyl plastic and is used to hold the normally separable parts of the refrigerator door in assembly during the construction of the door while, at the same time, enabling the gasket removably to be secured thereto in an efficient manner.

Figure 2:
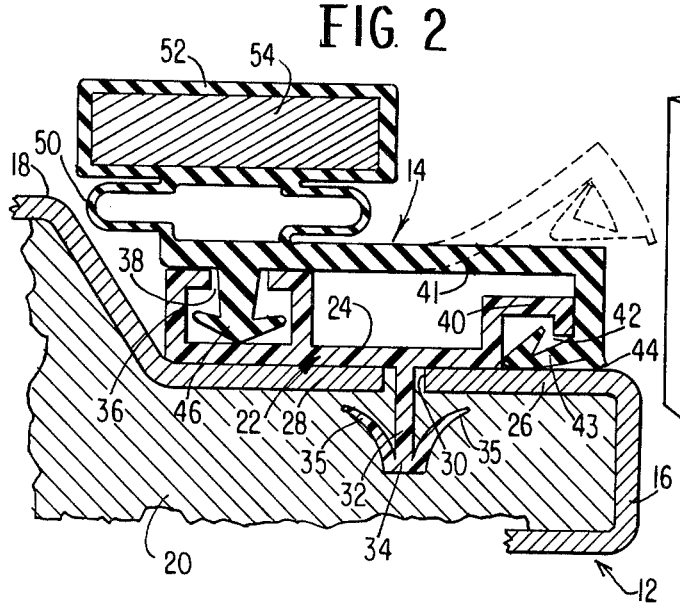
FIG. 2 is a fragmentary sectional view taken generally along the line 2—2 of FIG. 1.

In FIG. 2, the refrigerator door 12 is shown comprising an outer shell 16 and an inner pan 18. An insulating fill of expanded polyurethane foam 20 is shown inside the door 12, the foam having been applied and expanded during the manufacture of the door. A retainer member 22 also is shown. This retainer member 22 serves to maintain the pan and shell in proper position during the foaming-in process and is provided with means removably to accommodate the gasket 14 in coupled relationship thereto. The retainer 22 is provided with a base portion 24 that overlies the flanges 26 and 28 of the shell 16 and pan 18 respectively. The flanges 26 and 28 are coplanar and arranged juxtaposed during the assembly of the door, albeit, spaced one from the other to provide a slot 30 therebetween. The base 24 of the retainer member 22 has an extension 32 along its length which terminates in an arrowhead configuration 34 which includes arcuate arms 35. It will be appreciated that since this is a sectional view, the same configuration exists along substantially the entire length of the member 22.

On the left side of retainer member 22, as is viewed in FIG. 2, there is shown a box-like formation 36 integrally formed with the member 32 and having a narrow entrance 38. On the right side of the retainer member 22 along that edge thereof closest to the edge of the door 12, there is a generally reversed, hook-like formation 40 presenting a lateral entrance 42 in cooperation with the upper surface of the flange 26 of door 12.

In the assembly of the door 12, the pan 18 and the shell 16 are arranged in a manner shown in FIG. 2. The rigid member 22 preferably is assembled to the door by forcing the arrowhead configuration 34 and arms 35 through the slot 30. It will be appreciated that the arms or extensions 35 of configuration 34 may retain the parts of the door in assembly during the foaming-in process and thereafter, be embedded in the foam plastic. It is also understood that under certain circumstances it may be advantageous for the shell and pan to be assembled, in a simple jig (not shown) and the arrowhead configuration portions 34 forced through the slot 30 with the extensions 35 not touching either the pan or shell. While the shell and pan are maintained in this condition, heat may be applied to carryout the foaming-in process fully within the hollow enclosure defined by said shell and pan so as to embed the arrowhead configuration 34 therein. The foamed plastic is sufficiently adhesive to hold said door parts in assembly and firmly and permanently anchor the rigid member 22 to the door 12.

It should also be appreciated that the extensions 35 may bear against the undersurfaces of flanges 26 and 28 to retain the parts of the door in assembly. As is evident in the drawing, the free ends of extensions 35 are spaced from the pan and shell to enable the foam to completely embed said ends in the interior of the door.

The gasket of FIG. 2 is identified by reference numeral 14 and comprises a web portion 41, the right side of which, as viewed in FIG. 2, has a flexible outer hook-like configuration 43 provided with a little foot portion 44. On the left side of web 41 there is an arrowhead formation 46 and above and integrally secured to the web 41 is a well known bellows formation 50 terminating in a rectangular pocket 52 carrying magnetic members 54. After the door 12 has been assembled with the retainer member secured thereto in the manner described, the arrowhead formation 46 is driven through the entrance 38 along the entire length of the member 22. Afterwards, the hood portion 43 is rolled or otherwise inserted beneath the hook-like formation 40 through the lateral entrance 42. The gasket is formed of sufficiently flexible material such as rubber whereby to permit this manner of assembly.

It will be seen that the gasket 14 is firmly, yet removably, anchored in place on the member 22. With the hook formation 43 passed through lateral channel 42, the little foot portion 44 tightly engages the flange 26 thereby permitting little, if any, leakage of air past the gasket. In addition, the gasket 14 can be removed readily for cleaning and for replacement purposes, is simple to form and is efficient in operation.

Figure 3:
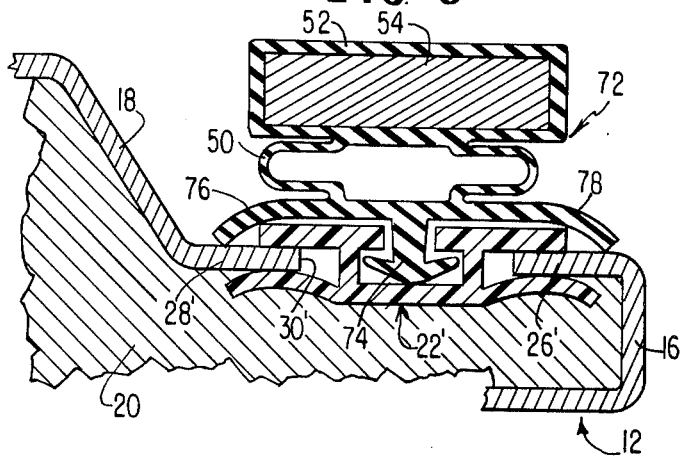
FIG. 3 is a view similar to that of FIG. 2, but showing a modified form of the invention.
Figure 4:
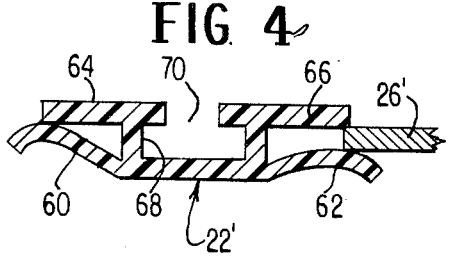
FIG. 4 is a sectional view taken through the retainer member of FIG. 3 but shown in the process of being assembled to the refrigerator shell.

In FIGS. 3 and 4, a modified form of the invention is shown in which the door 12 has a pan 18 and a shell 16 having similar flanges at 26' and 28' but in which the slot between them shown at 30' is much wider than in FIG. 2. There is a retainer member 22', as shown on the left hand side of FIG. 4. On the right hand side of FIG. 4, it will be seen that before the foaming-in process occurs, the retainer member 22' is forceably engaged upon the flanges 26' and 28', thereby clamping the flanges and hence the pan and shell in a relatively rigid and tight assembly while, of course, itself being secured the free ends of flanges 26" and 28" as shown in FIGS. 3 and 4 are spaced from the pan and shell respectively to enable the foam to embed said ends to complete the locked assembly. A large channel 68 with a narrow entrance 70 is provided in the member 22', and in this case, the gasket designated 72 has a single depending arrowhead configuraton 74 along its length which is adapted to enter the channel 68 through the entrance 70. Flexible arcuate flaps at 76 and 78 cover the edges of the flanges 64 and 66 respectively and may well engage against the flanges 28' and 26' respectively. A bellows 50 with pocket 52 and magnetic members 54 complete the gasket 72.

It will be seen that the invention provides a simple and yet effective means for aiding in the assembly of a refrigerator door of foamed-in construction while at the same time providing a novel and effective retainer member for securing a gasket thereto.

It will be obvious that many modifications may be made without departing from the spirit and scope of the invention as defined in the appended claims.

What it is desired to secure by Letters Patent of the United States is:

1. In a gasket and retainer assembly for use upon a refrigerator door and the like wherein the door has pan and shell portions assembled to define a slot between the edges thereof and thereafter the door is adapted to have foam insulation material foamed in situ in the interior of the door, the gasket and retainer assembly including an elongate flexible gasket and an elongate rigid retainer, said gasket and retainer having cooperable tongue and groove means for releasably coupling one to the other; the herein invention which comprises, said retainer having an anchor formation integral therewith and extending through the slot into the interior of the door, said anchor formation including a pair of oppositely facing arms extending toward said retainer to define, with said retainer, a pair of oppositely opening channels for accommodating said slot defining edges of the pan and shell, said arms each having the free ends thereof spaced from the pan and shell in the installed condition thereof to enable the foam to extend around said free ends positively to lock the pan, shell and retainer in assembly.

2. The structure as claimed in claim 1 wherein said arms are spaced from the retainer a distance selected to enable the pan and shell edges to be disposed loosely within said channels before setting of the foam.

3. The structure as claimed in claim 1 in which means are provided for sealing off at least the outermost edge of the assembly considered in the installed condition thereof on the door, said means comprising a cooperable coupling formation formed on the respective outermost edges of the gasket and retainer considered in installed condition thereof on the door, said gasket constructed and arranged to be rolled into engagement with said retainer along said outermost edges but being removable therefrom for repair or replacement thereof.

4. The structure as claimed in claim 1 in which means are provided for sealing off the outermost edge of said gasket assembly considered in the installed condition thereof on the door wherein said means comprise an overhanging lip terminating in a hook-like formation along the outermost edge of said gasket considered in the installed condition of the gasket on the door and said retainer includes a generally reversed hook-like portion defining, in installed condition of the retainer on the door, a narrow-entrance lateral channel, said hook-like formation adapted to be rolled into engagement within said lateral channel, but being removable therefrom for repair or replacement thereof.

5. The structure as claimed in claim 4 wherein the hook-like formation has a foot portion adapted to engage the surface of the door in installed condition of said gasket upon said assembly.

6. In a gasket assembly for a door of the so-called foamed-in variety for a refrigerator cabinet, said door having pan and shell members having marginal edges assembled with said edges spaced apart and facing one toward the other defining a slot therebetween, and wherein said gasket assembly includes a flexible gasket having an arrowhead formation and a pressure portion adapted to be engaged upon the cabinet surface for sealing the door when closed, and a retainer of relatively rigid material secured to said door and having a channel formation for receiving the arrowhead formation therein removably to couple the gasket to the retainer; the retainer comprising an elongate strip member having a planar base portion and a depending anchor formation disposed through said slot, said anchor formation having a pair of oppositely outwardly extending arms, said arms defining with said base portion a pair of slots receiving the marginal edges of the pan and shell members, the arms terminating in a pair of free ends spaced from the pan and shell in installed condition and said free ends being embedded interiorly of the door in the foam to lock the pan, shell, and retainer in assembled condition.

7. The structure as claimed in claim 6 wherein said arms are relatively resilient and normally disposed closer to the base portion than the thickness of the marginal edges of the pan and shell, whereby said marginal edges respectively of the pan and shell must be forceably urged into said slots.

8. The structure as claimed in claim 6 wherein said channel formation is carried by the depending anchor formation, the entrance thereto being through said base portion.

9. The structure as claimed in claim 6 wherein means are provided for sealing off at least the outermost edge of said gasket assembly considered in installed condition on the door, and said last-mentioned means comprise an enlarged formation integral with said gasket along one edge thereof and a hook-like flange integral with said retainer along one edge thereof, said flange defining with the surface of the door in installed condition of said retainer thereupon, a narrow entrance channel, and said enlarged formation secured within said channel.

10. A gasket assembly for use upon a refrigerator door operatively secured to a refrigerator cabinet body, said door being of the foamed-in variety and having a pan and a shell assembled with a slot therebetween to form a hollow configuration with foamable plastic material introduced therein, said gasket assembly comprising a flexible gasket having an arrowhead formation and a pressure portion adapted to be engaged upon the cabinet body surface upon closing of the door, and a retainer of relatively rigid material secured to the door, said retainer having a base portion and carrying a channel formation integral therewith provided with a narrow opening for receiving the arrowhead formation therein removably to couple the gasket to the retainer, anchor means integral with said retainer for securing the retainer to the door, said anchor means comprising a depending formation disposed through the slot between the pan and shell of the door, said depending formation having a pair of oppositely directed, arcuate arms integral with said depending formation and defining with said base portion, a pair of opposite opening lateral slots receiving the peripheral portions of the pan and shell therein, said arms terminating in free ends spaced from said pan and shell portions respectively in installed condition, whereby said arms are embedded in the foam locking the pan, shell, and retainer in assembled condition.

11. The gasket assembly as claimed in claim 10 wherein said arcuate arms approach the base portion whereby to engage the undersurfaces of the pan and shell respectively when the retainer is installed thereon.

References Cited by the Examiner
UNITED STATES PATENTS

| | | | |
|---|---|---|---|
| 1,998,791 | 4/1935 | Schanz. | |
| 2,113,152 | 4/1938 | Johnston | 20—35 X |
| 2,693,009 | 11/1954 | Beck | 20—35 |
| 2,700,197 | 1/1955 | Kesling | 20—35 X |
| 2,786,241 | 3/1957 | Garvey et al. | 20—35 |
| 2,823,430 | 2/1958 | Morton | 20—69 |
| 3,079,653 | 3/1963 | Cornell | 20—69 |
| 3,137,900 | 6/1964 | Carbary | 20—35 |

FOREIGN PATENTS

| | | |
|---|---|---|
| 758,806 | 10/1956 | Great Britain. |
| 931,172 | 7/1963 | Great Britain. |

HARRISON R. MOSELEY, *Primary Examiner.*

CHARLES E. O'CONNELL, *Examiner.*

W. E. HEATON, *Assistant Examiner.*